Jan. 5, 1960    D. B. TSCHUDY    2,919,545
THRUST REVERSER NOZZLE
Filed Aug. 6, 1956    2 Sheets-Sheet 1

INVENTOR.
Donald B. Tschudy
BY
*H. Oldham*
ATTORNEY

INVENTOR.
Donald B. Tschudy
ATTORNEY

United States Patent Office 2,919,545
Patented Jan. 5, 1960

2,919,545

THRUST REVERSER NOZZLE

Donald B. Tschudy, Canton, Ohio, assignor to Goodyear Aircraft Corporation, Akron, Ohio, a corporation of Ohio Application August 6, 1956, Serial No. 602,203

1 Claim. (Cl. 60—35.54)

This invention relates to the construction of an exhaust nozzle for a jet-propelled aircraft and in particular to a nozzle capable of reversing the thrust of the exhaust gas of a nacelle-enclosed jet engine to reduce the landing speed of the aircraft.

The application of thrust reversers to aircraft jet engines is of relatively recent date and, therefore, the development in this field, which is of greatest importance in the operation of high speed aircraft, is still wide open for improvement.

It is the general object of the invention to provide a nozzle for an aircraft jet engine capable of reversing the jet gases in substantially opposite direction with least loss of power.

Another object of the invention is to provide a reversible nozzle for a jet engine with two pairs of interacting jet gas deflectors which in non-deflected position form parts of the nozzle and nacelle walls, respectively.

Another object of the invention is to provide a cooling duct between the nozzle wall and the nacelle wall furnishing cooling air with the nozzle either in position for straight jet flow or for reversed jet flow.

Another object of the invention is to provide for an aircraft jet engine a reversible jet nozzle of simple and light construction.

Another object of the invention is to provide for an aircraft jet nozzle in completely assembled form to be attached to the engine.

The aforesaid objects of the invention and other objects which will become apparent as the description proceeds are achieved by providing at opposite sides a pair of doors in the nacelle wall and a pair of doors in the jet nozzle wall. The doors in each case form parts of their respective walls in normal axial jet flow. The nozzle doors of suitable width and outer contour are pivotally mounted on the fixed nozzle portion, whereas the nacelle doors, of substantially the same width and of similar outer contour as the nozzle doors, are swingable about separate pivots in the nozzle doors and in a direction opposite thereto. The doors are operated by hydraulic means having cables attached thereto with ends thereof fastened to quadrants fixed to levers pivotally mounted on the nozzle and which are provided at their free ends with pins in active engagement with the nacelle doors for simultaneously opening and closing the nozzle doors and the nacelle doors in dependence of each other.

For a better understanding of the invention reference should be had to the accompanying drawings, wherein.

Figure 1:
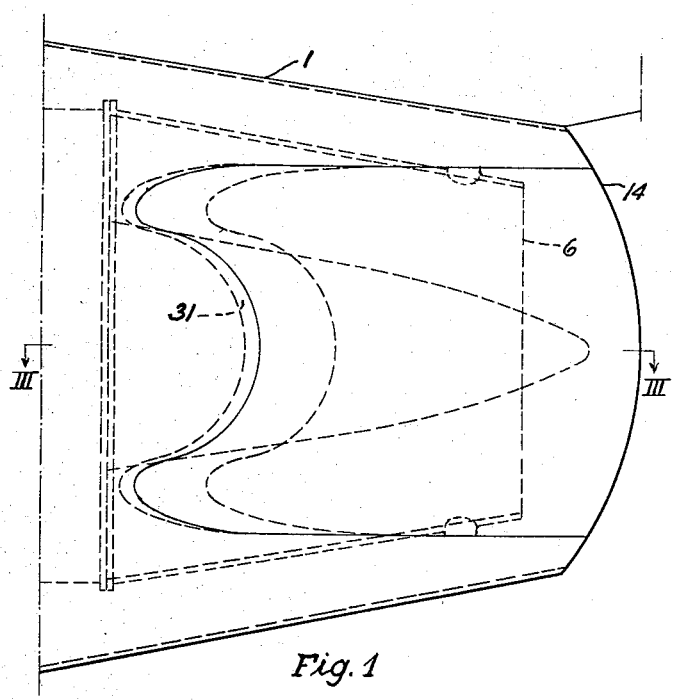
Fig. 1 is a side view of one embodiment of the invention.
Figure 2:
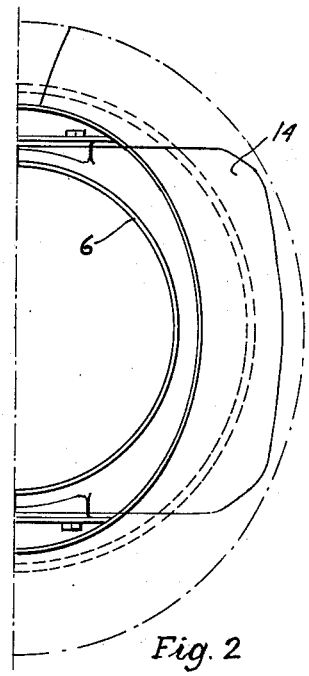
Fig. 2 is a one-half end view.
Figure 3:
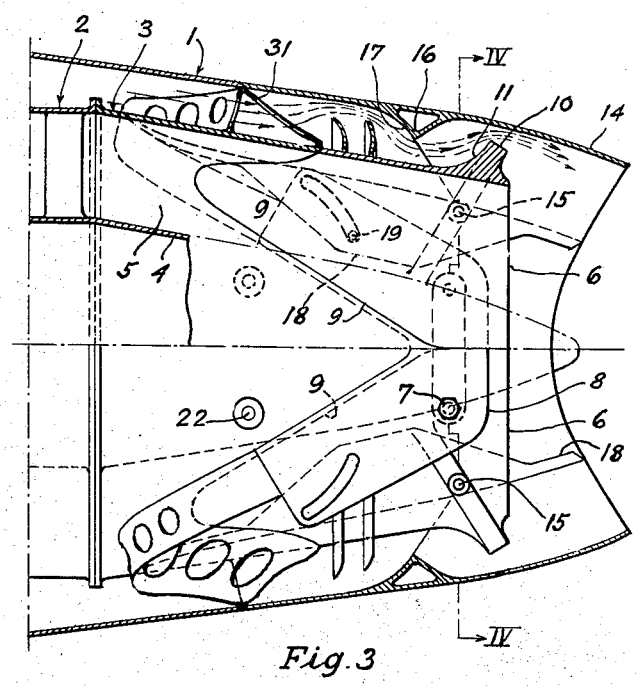
Figure 4:
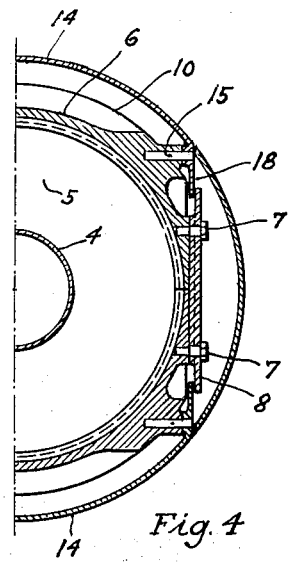
Figure 5:
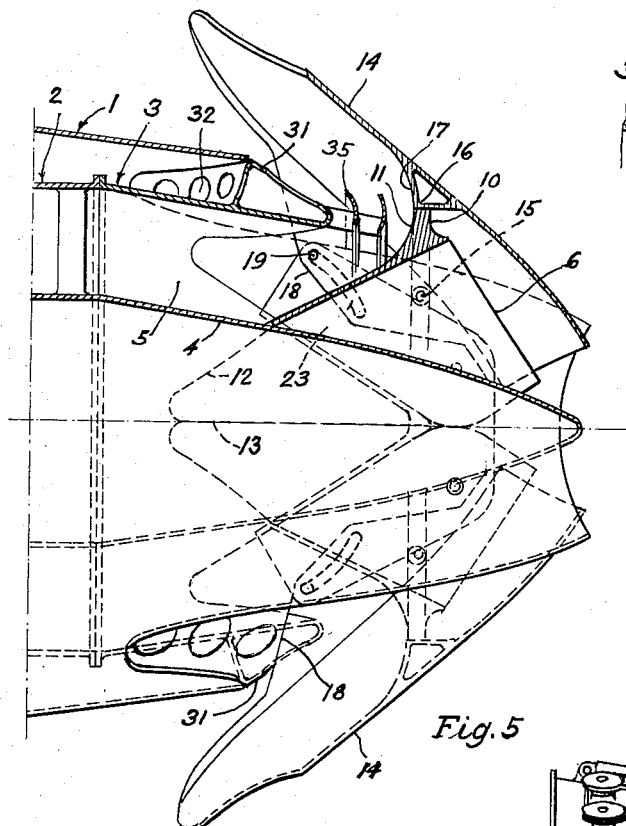
Figure 6:
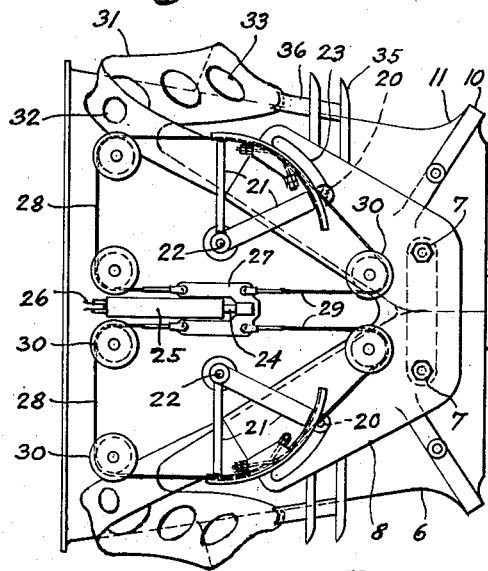
Figure 7:
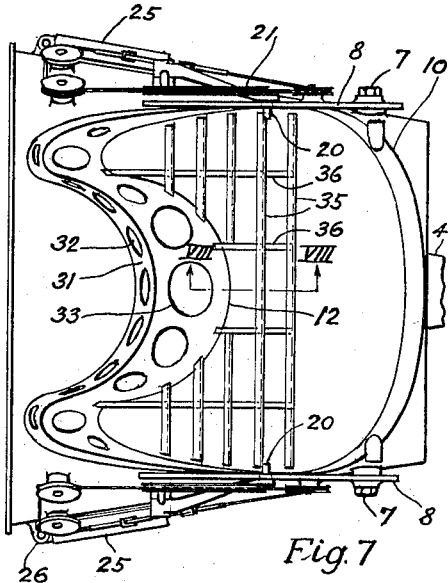

Fig. 3 in the upper half is a cross-sectional view taken on line III—III of Fig. 1, with the jet nozzle doors in normal position, but showing in the lower half the jet nozzle in top view;

Fig. 4 is a cross-sectional view taken on line IV—IV of Fig. 3;

Fig. 5 in the upper half is a cross-sectional view also taken on line III—III of Fig. 1 and the lower half a top view, but with the nozzle doors and nacelle doors in position for reversing the exhaust jet;

Fig. 6 is a top view of the jet nozzle with the door operating mechanism mounted thereon;

Fig. 7 is a side view of Fig. 6; and

Figure 8:
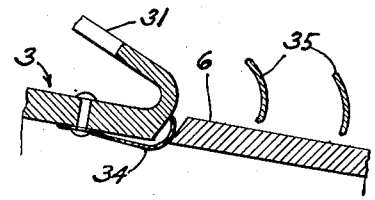

Fig. 8 is a cross-sectional view taken on line VIII—VIII of a detail showing a nozzle door seal.

With specific reference to the form of the invention illustrated in the drawings, the numeral 1 indicates a nacelle in which is located a jet engine 2 having attached thereto a tapered tail pipe or exhaust nozzle 3 containing a tail cone 4 forming therewith an annular exhaust duct 5.

The tapered nozzle has the advantage that the exhaust gas speed increases until it leaves the nozzle and thereby increases the thrust.

For reversing the flow of the engine exhaust gases from a rearward direction into a forward direction the rear end of the nozzle wall is formed by two opposite doors 6 hinged by pivots 7 to side plates 8 welded along the edges 9 of the fixed portion of nozzle 3. The doors 6 tilted inwardly, as shown in Fig. 5, for reversing the exhaust direction are provided on the outside with a surrounding rib 10 extending transversely to the nozzle axis and having a curved deflecting surface 11. The outer edge configuration of the doors 6 includes a central cut out 12 fitting in inwardly tilted position around tail cone 4, whereas the outer, substantially straight edges 13 of the doors butt against each other to prevent the exhaust gases escaping rearwardly.

In cooperation with the nozzle doors 6 are doors 14 forming a part of the nacelle wall 1 and which have a configuration somewhat similar to that of the nozzle doors 6 to which they are hinged by pins 15 in the ribs 10. The doors 14 are provided on the inside with a rib 16 having a deflecting surface 17 which, when these doors are swung outwardly, forms a smooth and curved backward continuation of the deflection surface 11 of the doors 6. For cooperative functioning of the two doors, the outwardly swingable nacelle doors are provided with side flanges 18 containing a hole 19 engaging a pin 20 fixed to the quadrant 21 swingable about a pin 22 secured in the wall of the exhaust nozzle 3 and passing through the arcuate slot 23 in the side plates 8. For actuating the exhaust nozzle doors 6 and the nacelle doors 14 the piston rod 24 of a hydraulic cylinder 25 hinged to a lug 26 carries a crosshead 27 from which lead in opposite direction cables 28 and 29 anchored on the quadrant 21 in a closed arrangement over pulleys 30. The hinge points of the exhaust nozzle doors 6 and of the nacelle doors 14 are so positioned that the exhaust gases will safely hold these doors in either open or closed position.

In moving the doors from a straight rearward exhaust thrust position, Fig. 3, to a position, shown in Fig. 5 for reversing the exhaust thrust by energizing the cylinders 25, the quadrant pins 20, passing through the holes 19 of the nacelle door flanges 18, push the nacelle doors 14 outwardly and upwardly whereby the exhaust nozzle doors 6 are swung inwardly against the tail cone 4, and the adjoining door ribs 10 and 16 form with their deflecting surfaces 11 and 17 a smooth flow guide for the exhaust gases leaving the exhaust nozzle 3 in forward direction at an angle of about 40° with its longitudinal axis. Also in this direction the exhaust gases have the tendency to safely keep the doors in deflected position in case of failure of pressure in the cylinders 25. Along the door openings of the nozzle 3 are provided hollow triangular stiffeners 31 acting also as support for the nacelle wall along portions of the nacelle door openings.

Holes 32 and 33 in the stiffener walls permit the flow of cooling air between nozzle and nacelle walls with the doors in position for rearward as well as for reversed exhaust flow. To prevent exhaust gas leakage between nozzle and nozzle doors a seal 34 is provided in the form of suitably shaped spring steel plates. In addition vanes 35 fastened to bars 36 which in turn are attached to the stiffeners 31 outside of the nozzle wall may be employed for better reverse flow of the exhaust gases.

From the above description it will be understood that the objects of the invention have been achieved.

While certain representative embodiments and details have been shown for the purpose of illustrating the invention, it will be apparent to those skilled in this art that various changes and modifications may be made therein without departing from the spirit or scope of the invention.

What is claimed is:

In a jet engine thrust reverser the combination of a tail cone, an exhaust nozzle surrounding the tail cone and providing a passage for rearward flow of exhaust gasses between the cone and nozzle, a nacelle surrounding the exhaust nozzle and providing a passage for rearward flow of cooling air between the nozzle and the nacelle, door means pivotally mounted on the nozzle and forming part of the wall thereof, means for moving the door means from the position forming part of the nozzle wall into engagement with the cone to substantially block off the exhaust gas passage, vane means pivotally mounted on the door means and forming part of the wall of the nacelle and movable simultaneously with the door means from the position forming part of the nacelle wall to a position into engagement with the door means to form with the door means a substantially forward deflection of the flow of exhaust gases and cooling air, and rib portions on the door means and the vane means which engage with each other to provide a relatively smooth flow of the exhaust gases and cooling air when the door means and vane means are in forward deflection position, said rib portions being out of alignment and offset longitudinally of each other and having less height than the distance between the nozzle and the nacelle to allow flow of cooling air in the passage between the nozzle and the nacelle when the door means and the vane means are positioned to form part of the walls of the nozzle and the nacelle respectively.

References Cited in the file of this patent

UNITED STATES PATENTS

| 2,637,164 | Robson et al. | May 5, 1953 |
| 2,681,548 | Kappus | June 22, 1954 |
| 2,682,147 | Ferris | June 29, 1954 |
| 2,798,362 | Rainbow et al. | July 9, 1957 |
| 2,802,333 | Price et al. | Aug. 13, 1957 |
| 2,839,891 | Drakeley | June 24, 1958 |

FOREIGN PATENTS

| 745,720 | Great Britain | Feb. 29, 1956 |

UNITED STATES PATENT OFFICE

CERTIFICATE OF CORRECTION

Patent No. 2,919,545                                    January 5, 1960

Donald B. Tschudy

It is hereby certified that error appears in the above numbered patent requiring correction and that the said Letters Patent should read as corrected below.

In the grant, lines 2 and 3, and in the heading to the printed specification, lines 4 and 5, for "a corporation of Ohio" read -- a corporation of Delaware --.

Signed and sealed this 14th day of June 1960.

(SEAL)
Attest:

KARL H. AXLINE
Attesting Officer

ROBERT C. WATSON
Commissioner of Patents